Dec. 23, 1947. J. J. TIPTON 2,433,172
PIPE CLAMP
Filed March 16, 1945
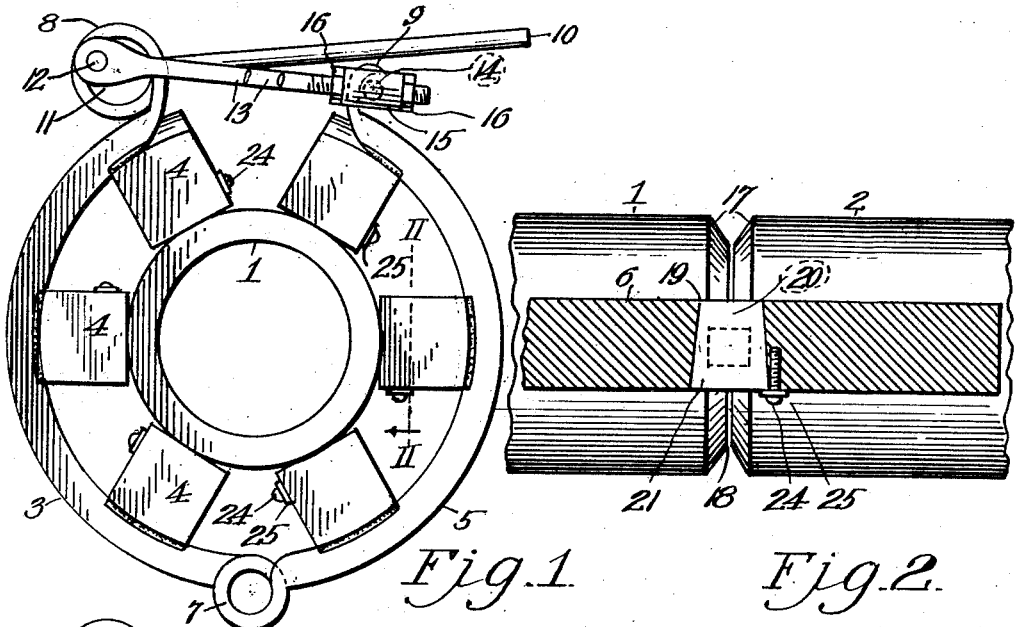
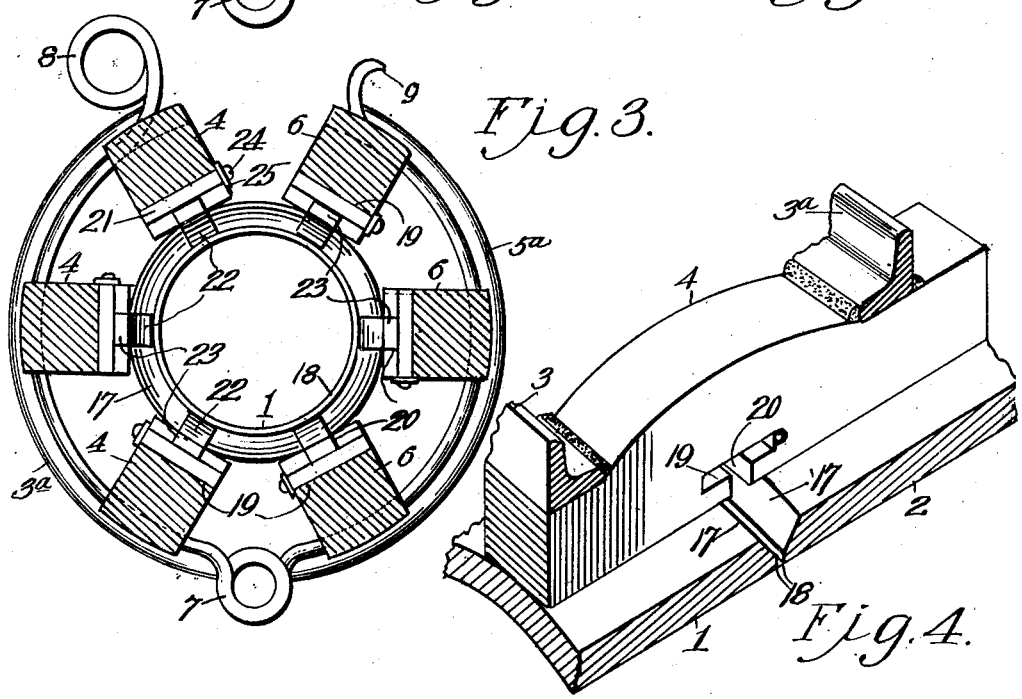
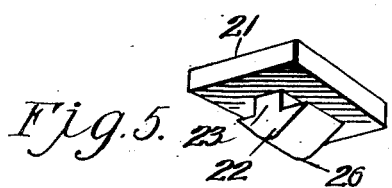
Inventor
John J. Tipton.
Attorney Patented Dec. 23, 1947

2,433,172

UNITED STATES PATENT OFFICE 2,433,172

PIPE CLAMP

John J. Tipton, Paola, Kans.

Application March 16, 1945, Serial No. 583,155

1 Claim. (Cl. 113—102)

This invention relates to that class of appliances for encircling and clamping two pipes in end-to-end fixed alinement preliminary to welding the pipes permanently together as a part of a pipeline for oil, gas etc.

The object of the invention is to make provision in clamps of the character indicated, for the use of removable spacers of variable size to accommodate the clamps to pipes of slight differences in size or wall thickness.

Another object is to produce a spacer which may serve as a gauge for quickly determining proper spacing between a pair of pipes of particular diameter or wall thickness, and which is adapted for easy application to or removal from the pipe clamp.

With the objects mentioned in view, the invention consists in certain novel and useful features of construction and organization as hereinafter described and claimed; and in order that it may be fully understood, reference is to be had to the accompanying drawing, in which:

Figure 1 is an elevational view of a pipe clamp embodying the invention and adapted for holding two longitudinally-aligned pipes spaced apart in proper relation for efficient welding, the pipes shown appearing in end elevation.

Figure 2 is a fragmental side elevation of two pipes in longitudinal alinement, and a fragment of the clamp in section on the line II—II of Figure 1.

Figure 3 is a central vertical cross section of the clamp, the lever-operated linkage for effecting closing and opening operation of the clamp, being omitted.

Figure 4 is an enlarged fragmental perspective of parts of the clamp and alined pipes.

Figure 5 is a detail perspective of one of the series of spacers forming part of the clamp.

Referring now to the drawings in which similar parts are identified by corresponding reference characters, 1 and 2 represent two alined pipes to be welded together at their adjacent ends to form a part of a pipeline for the passage of oil, gas and the like.

The clamp for holding the pipes firmly preliminary to the welding operation, is constructed as follows: There are two oppositely-bowed members, one comprising a pair of similar spaced arcuate angle-iron sections 3 and 3a, connected by a series of spaced parallel cross-bars 4. The other member is likewise composed of two sections of angle-iron type, 5 and 5a, connected together by a series of parallel cross-bars 6, which with cross-bars 4 are welded to and project inward from their respective sections.

The members at corresponding ends of the arcuate sections are hinged together at 7, and open or close by pivotal movement as customary. The arcuate sections 3 and 3a, terminate at their free ends in similar ring heads 8, corresponding ends of sections 5 and 5a, terminating in hooks 9 opening or facing away from said heads.

To clamp the members with their cross-bars 4 and 6, extending longitudinally of and fitting upon both pipes, a lever 10 has a hub 11 journaled at its ends in the two ring heads 8 and provided with eccentrically disposed pins 12 (one only being disclosed) pivotally engaged by a linkage composed of two parallel threaded rods 13, a cross rod 14 equipped at its ends with sleeves 15 slidable on the rods 13, and nuts 16 adjustable on rods 13 to secure the sleeves at the desired point of adjustment relative to said rods, and thus accommodate the linkage for securing the clamp on pipes of slightly varying diameter.

The linkage is of conventional type and for all practical purposes corresponds to that shown in my Patent No. 1,693,064 of November 27, 1928, differing from the latter only in the fact that it is adjustable as to length.

The cross-bars 4 and 6 of the clamp, are equipped midway their length with spacers for projection into the annular channel or groove formed by the chamfered or beveled ends 17 of the pipes. Where the weld is to be made electrically, it has been found that the operation of proper and uniform spacing of the pipes can be made with greater accuracy and celerity, provided the spacers fitted in the channel or groove terminate at the outer ends or shoulders 18, such arrangement enabling the operator in the tack-welding operation, to run a so-called welding stringer bead inward of the spacers and hence unbrokenly or continuously around the pipes between the shoulders 18, and thus provide a tack weld of greatest strength.

For conservation of material and for accommodating the clamp to utilize spacers of a plurality of sizes, the cross-bars 4 and 6 are provided with cross passages 19, preferably of tapered or wedge form as shown, and with narrow slots 20 opening into said passages and to and through the inner faces of said bars.

The spacers comprise tapered plates 21, for fitting snugly in said passages 19, V-shaped heads 22 formed with rounded or truncated apices, and neck portions 23 between and connecting the plates and said heads for fitting in said slots of the cross-bars, and to prevent chance of the spacers becoming dislodged from position, particularly when the clamp is not in use, screw bolts 24 engage the cross-bars and hold washers 25 in overlapping relation with the wide ends of said plates.

It is almost universal in the laying of pipe lines to resort to electric welding as a more efficient and dependable method than by the use of acetylene welding, but it has been found that to electrically weld dependably, the chamfering or beveling of the ends of the pipes must terminate short or outward of the inner perimeter of the pipes to provide the narrow parallel vertical walls 18, clearly shown in Figure 4, the pipes being so disposed that the space between them, as viewed in Figure 4, approximates the shape of the letter Y, the space varying in width in accordance with the diameter of the pipes, and it has also been found that if the heads 22 have been rounded or truncated at their apices for bridging the narrow or stem portions of the channels or grooves, they function as gauges in facilitating the spacing apart of the pipes, and prevent expansion or contraction tending to vary the width of the space between the pipes under the heat generated by the tack-welding operations or the cooling of the pipes after the tack-welding operations are completed.

The removable character of the spacers imparts conservation advantages, as a broken or damaged one can be replaced easily and quickly at small cost.

From the foregoing it will be apparent that I have produced a pipe clamp possessing the features of advantage set forth as objectives, and that it is susceptable of modification in minor particulars within the spirit and scope of the appended claim.

I claim:

In a pipe clamp, a pair of parallel members, each comprising two arcuate sections hinged together at corresponding ends, bars connecting corresponding sections of the two members and movable therewith for clamping engagement with or withdrawal from a pair of adjacent alined pipes and provided with detachable spacers for fitting between the ends of such pipes; corresponding arcuate sections of the two members terminating at their opposite ends from the hinge points, in ring heads and hooks respectively, a cylindrical hub engaging said ring heads and provided with a lever and eccentrically-disposed alined pins, and a linkage for the sections of the clamp composed of parallel rods pivotally connected to said pins respectively, a cross rod between the linkage rods, a sleeve adjustable on each of the linkage rods and carried by said cross rod, and adjustable collars on the linkage rods, engaging opposite ends of said sleeves.

JOHN J. TIPTON.

REFERENCES CITED

The following references are of record in the file of this patent:

UNITED STATES PATENTS

| Number | Name | Date |
|---|---|---|
| 1,693,064 | Tipton | Nov. 27, 1928 |
| 1,872,276 | Graham | Aug. 16, 1932 |
| 2,080,563 | Eskilson et al. | May 18, 1937 |
| 2,127,828 | Milton | Aug. 23, 1938 |
| 2,371,376 | Bisbee | Mar. 13, 1945 |